United States Patent
Lepley

(10) Patent No.: US 9,027,538 B2
(45) Date of Patent: May 12, 2015

(54) DIGITAL CONTROL OF GASEOUS FUEL SUBSTITUTION RATE FOR DUAL-FUEL ENGINES

(75) Inventor: Joseph M. Lepley, Girard, OH (US)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 488 days.

(21) Appl. No.: 13/222,630

(22) Filed: Aug. 31, 2011

(65) Prior Publication Data

US 2013/0054116 A1 Feb. 28, 2013

(51) Int. Cl.
| F02B 7/00 | (2006.01) |
| F02D 41/00 | (2006.01) |
| F02D 19/06 | (2006.01) |
| F02D 29/04 | (2006.01) |
| F02D 29/06 | (2006.01) |

(52) U.S. Cl.
CPC ........ *F02D 41/0025* (2013.01); *F02D 19/0647* (2013.01); *F02D 29/04* (2013.01); *F02D 29/06* (2013.01); *F02D 19/0607* (2013.01); *F02D 41/0027* (2013.01); *Y02T 10/36* (2013.01)

(58) Field of Classification Search
USPC ............... 123/27 GE, 525–529, 575–578
See application file for complete search history.

(56) References Cited

U.S. PATENT DOCUMENTS

| 5,937,800 | A * | 8/1999 | Brown et al. ............. 123/27 GE |
| 6,250,260 | B1 * | 6/2001 | Green .................. 123/27 GE |
| 7,093,588 | B2 * | 8/2006 | Edwards ................. 123/525 |
| 7,322,345 | B2 * | 1/2008 | Saito et al. ............. 123/529 |
| 7,913,673 | B2 * | 3/2011 | Vanderslice et al. ........ 123/525 |
| 8,342,158 | B2 * | 1/2013 | Ulrey et al. ............. 123/525 |
| 8,413,642 | B2 * | 4/2013 | Johnson et al. ........... 123/527 |
| 8,516,997 | B2 * | 8/2013 | Pursifull ............... 123/516 |
| 2004/0045539 | A1 * | 3/2004 | Furuta et al. ............ 123/529 |
| 2008/0127950 | A1 * | 6/2008 | Malm .................. 123/527 |

* cited by examiner

*Primary Examiner* — Stephen K Cronin
*Assistant Examiner* — Joseph Dallo
(74) *Attorney, Agent, or Firm* — Dykema Gossett PLLC

(57) ABSTRACT

A gaseous fuel control system for a dual-fuel internal combustion engine comprising a plurality of valves for controlling the amount of gaseous fuel supplied to the engine. The valves have adjustable full-open flow rates and rapidly move from full-open to full-closed in response to a digital signal. An electronic system for monitoring at least one engine operating parameter maps the parameter value to control the opening and closing of the valves to establish a desired gaseous fuel flow rate.

9 Claims, 6 Drawing Sheets

DIGITAL CONTROL OF GASEOUS FUEL SUBSTITUTION RATE FOR DUAL-FUEL ENGINES

BACKGROUND OF THE INVENTION

1. Field of the Invention

Dual-fuel engines are typically diesel or liquid fuel engines with which up to about ninety percent of the fuel can be natural gas. Dual-fuel engines are often used to power emergency or standby generators that are associated with critical facilities such as hospitals. They are also used to drive wellhead generators that run on natural gaseous fuel being recovered from the associated well. In most applications the variable control of the liquid/gaseous fuel ratio is important. This application is directed to an open loop control of the liquid/gaseous fuel ratio with a plurality of digitally-actuated gaseous fuel valves.

2. Description of Related Art

There is a well-known need to control the liquid/gaseous fuel ratio in dual-fuel engines based on load and other factors. Ordinary diesel engines can be converted to run on a mixture of diesel and natural gas (or the like) by fumigating the input air with natural gas and injecting a reduced amount of diesel fuel into the cylinders at the top of the compression stroke. The operation of dual-fuel engines in this manner is described in U.S. Pat. No. 6,250,260 to Green entitled "Bi-Fuel Control System and Assembly for Reciprocating Diesel Engine Powered Electric Generators, incorporated herein by reference. As explained in the Green patent, as the amount of gaseous fuel is increased, the amount of diesel fuel is automatically decreased by the speed governor that controls the amount of diesel fuel injected to the cylinders at the end of each compression stroke. In order to assure ignition, typically at least ten percent of the fuel must be the liquid fuel injected directly into the cylinders. For safety, such systems have solenoid operated shut off valves for disconnecting the gaseous fuel supply.

The percentage of the total fuel which can be safely or advantageously replaced by the gaseous fuel varies with operating conditions. Thus, it is necessary to control the gaseous fuel substitution rate. Control of the gaseous fuel substitution rate has been previously done on a closed loop basis using traditional analog control loops whereby a continuously variable device is adjusted by comparing a feedback signal with a command signal and substantially continuously adjusting the output of the variable device to diminish the difference between the command signal and the feedback signal. After each adjustment, new operating conditions are compared to the desired (commanded) condition until the desired substitution rate is reached. In a typically implemented digital closed loop system, it normally takes a number of iterations to reach the desired operating condition. Even in a purely analog system, this is essentially an iterative process in which it may take on the order of tens of seconds or minutes.

In certain applications, for example, an oil well drill rig generator driver, the engine load is very cyclical and never stays at a constant operating condition for any length of time. In these applications the closed loop system for gaseous fuel substitution does not work as well as desired. Operating conditions can change faster than the control loop can make the needed adjustments; therefore the desired equilibrium at set point may never be reached.

SUMMARY OF THE INVENTION

Briefly, according to this invention there is provided a gaseous control system for a dual-fuel internal combustion engine comprising one or more combustion cylinders and in which a gaseous fuel is fumigated to the air intake and the liquid fuel is injected into the cylinders near the end of the compression stroke. The improvement comprises the gaseous fuel control system for controlling the amount of gaseous fuel supplied to the one or more cylinders of the engine comprising an inlet connectable to a pressurized gaseous fuel source and a plurality of valves which rapidly move from full-open to full-closed. The plurality of valves have adjustable full-open flow rates and are capable of moving from full-open to full-closed in response to a digital signal. The valves are arranged in parallel between the inlet connectable to the pressurized gaseous fuel source and the one or more cylinders of the engine. An electronic system monitors at least one engine operating parameter and has a computing device for mapping the value of one or more engine operating parameters to control the opening and closing of one or more of the plurality of valves to establish a desired gaseous fuel flow rate. Preferably, the plurality of valves are solenoid valves with adjustable flow control orifices.

Briefly, according to another embodiment of this invention there is provided a genset consisting of a dual-fuel internal combustion engine driving a generator. The engine comprises one or more combustion cylinders. A gaseous fuel is fumigated to the air intake for the cylinders and a liquid fuel is injected into the cylinders near the end of the compression stroke to cause ignition. The improvement comprises a gaseous fuel control system for controlling the amount of gaseous fuel supplied to the one or more cylinders of the engine comprising an inlet connectable to a pressurized gaseous fuel source and a plurality of valves which rapidly move from full-open to full-closed. The plurality of valves have adjustable full-open flow rates and are capable of moving from full-open to full-closed in response to a digital signal. The valves are arranged in parallel between the inlet connectable to the pressurized gaseous fuel source and the one or more cylinders of the engine. An electronic system monitors at least one engine operating parameter and has a computing device for mapping the value of one or more engine operating parameters to trigger the opening of one or more of the plurality of valves to establish a desired gaseous fuel flow rate. Preferably, the plurality of valves are solenoid valves with adjustable flow control orifices.

BRIEF DESCRIPTION OF THE DRAWINGS

Further features and other objects and advantages will become clear from the following detailed description made with reference to the drawings in which.

DESCRIPTION OF THE PREFERRED EMBODIMENTS

Figure 1:
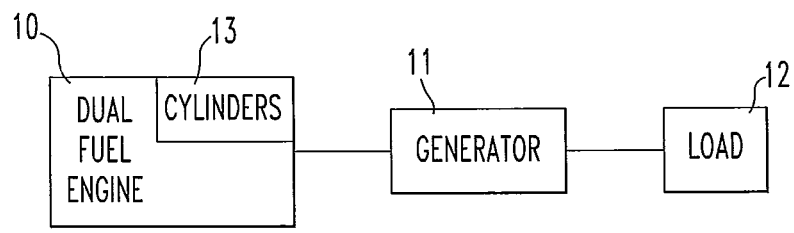
FIG. 1 is a schematic drawing of a genset and load.

Referring now to FIG. 1, there is shown a dual-fuel engine 10 physically connected to a generator 11 which is electrically connected to a load 12 such as a pump motor for driving a pump on a fraking truck. The dual-fuel engine and physically connected generator are known in the art as a "genset." The dual-fuel engine is typically a diesel engine having a plurality of cylinders 13 in which the air fuel mixtures are burned to create the pressure for driving pistons as is all well understood in the art.

Figure 2:
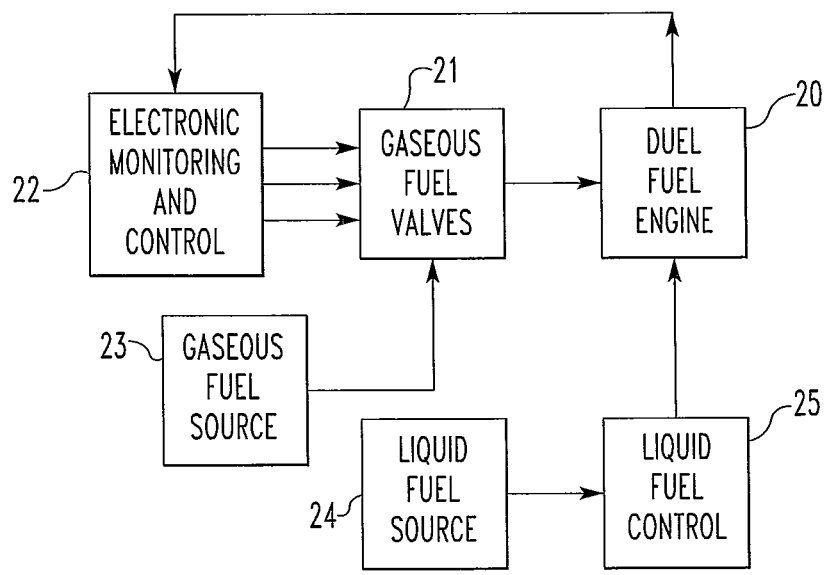
FIG. 2 is a schematic drawing of a dual-fuel engine with a gaseous control system according to this invention.

Referring now to FIG. 2, there is shown a schematic drawing of a dual-fuel engine 20 with associated gaseous fuel valves 21 and electronic monitoring and control system 22 according to one embodiment of this invention. Also shown are the gaseous fuel source 23, liquid fuel source 24, and liquid fuel control 25 which are typically associated with dual-fuel engines.

Referring to FIGS. 3 to 7, a single channel valve assembly comprises an input chamber 26 with a port 27 for connection to a combustion air supply. The assembly also comprises an output chamber 28 having an output port 29 for connection to an air intake manifold for one or more cylinders 13 of a dual-fuel engine 10. A bypass channel 30 connects the input chamber 26 with the output chamber 28 to provide a path for flow of air. A balancing valve 31 is placed in the bypass channel 30. Positioned between the inlet and outlet chamber are a plurality of adjustable solenoid valves 32, 33, and 34 which, in the open position, inject gaseous fuel into the output chamber. The valves have inlet 35 connectable to a pressurized gaseous fuel source.

Figure 8:
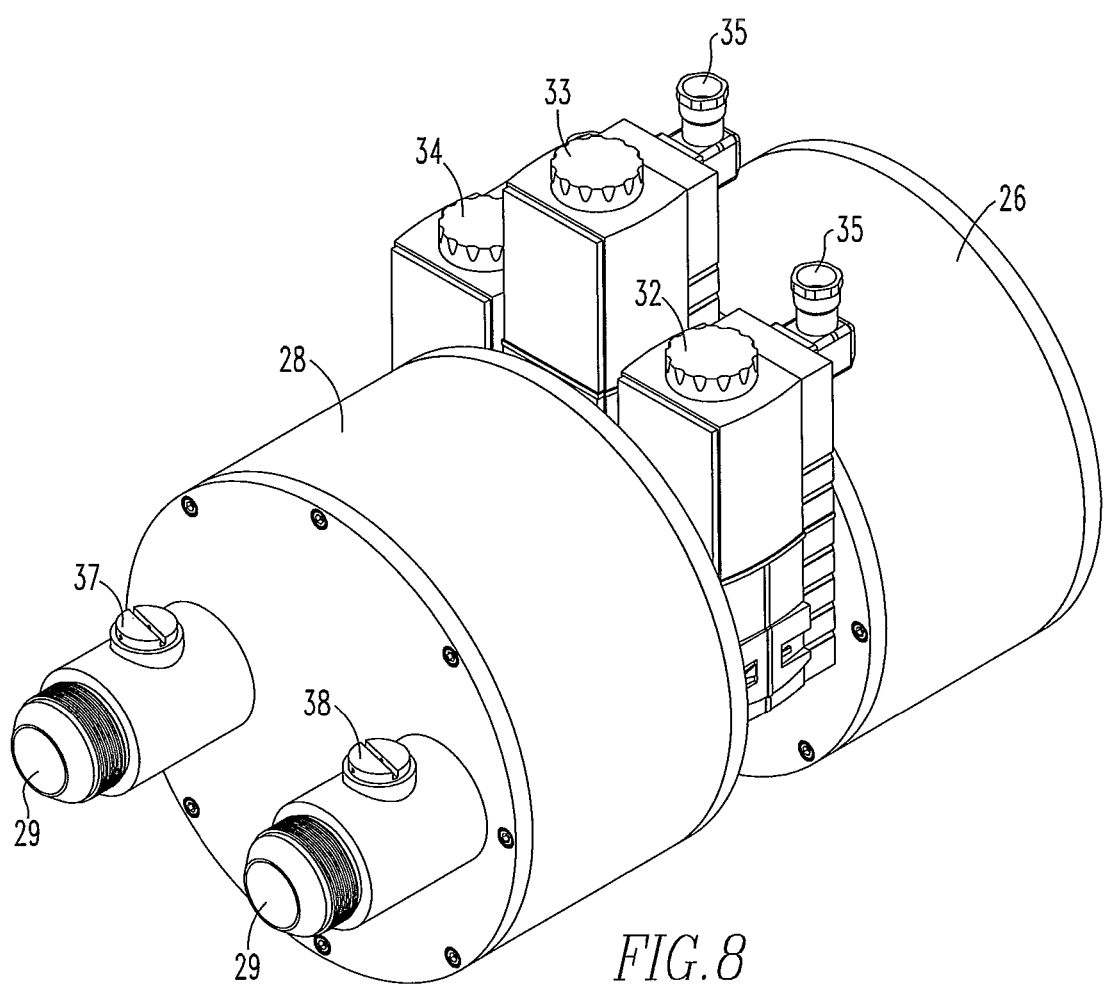
FIG. 8 is a perspective drawing of a dual channel valve assembly with associated inlet and outlet chambers for use with a gaseous fuel control system according to this invention.
Figure 9:
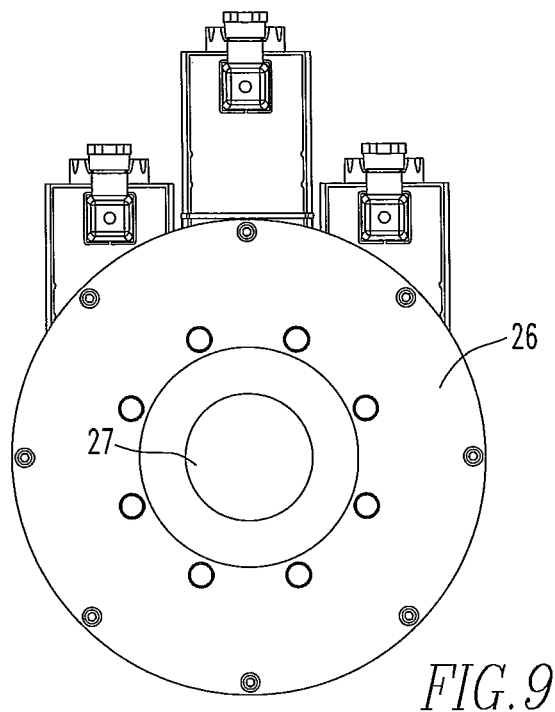
FIGS. 9 and 10 are inlet side, front, outlet side, and back side drawings respectively of the dual channel valve assembly shown in FIG. 8.
Figure 10:
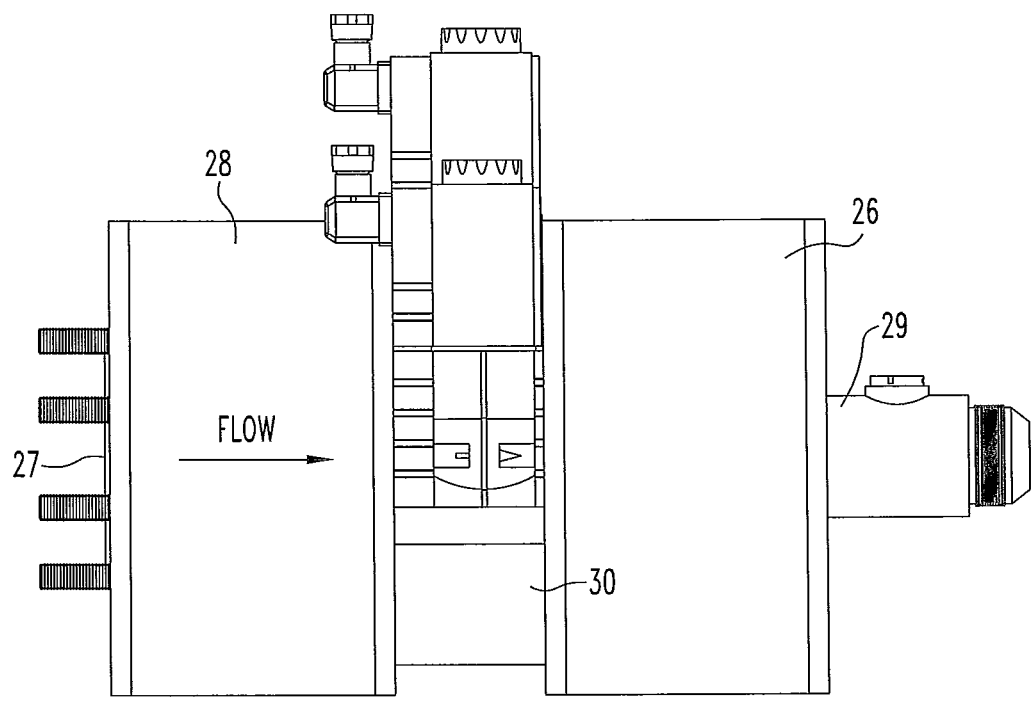

Referring to FIGS. 8 to 10, the dual channel valve assembly is substantially the same as the single channel valve assembly. However, balancing valves 37 and 38 are provided at the outlet ports of the output chamber.

The electronic monitoring and control system controls the solenoid valves with an open loop control strategy. The electronic monitoring and control system may be based upon the use of solid state programmable microcontroller having analog and digital inputs, digital outputs, a central processing unit, and memory storage. Thus, it is possible to place the liquid/gaseous fuel ratio or substitution rate into a desired "band of operation." A stored program repeatedly monitors sensor inputs, compares them to a map correlating input values to substitution rates, and commands the digital outputs accordingly to directly (or indirectly via an output switch) open or close appropriate valves.

The proposed control system for dual-fuel engines uses multiple individually controlled valves each controlled by a discrete output switch. Each discrete valve supplies the amount of gaseous fuel substitution as desired for a subset of operating conditions. Various combinations of these valves allow a wide range of adjustment of the total gaseous fuel substitution rate without any significant delay, that is, less than one second.

In a preferred embodiment, the electronic monitoring and control system monitors a variety of operating parameters for both safety and permissible gaseous fuel substitution rate. Safety functions would be evaluated based upon measured pressures, temperatures, speeds, and flammability limits. The acceptable gaseous fuel substitution rate would be based upon a stored map of substitution rate versus engine load or electrical power output of an engine driven generator. Additional adjustments for abnormal operating conditions for safe but reduced gaseous fuel substitution rates might be included.

Consider as a non-limiting example, an engine application where the desired gaseous fuel substitution rates are divided into four distinct bands of operation. When the engine load is less than 25% of rated load, the gaseous fuel substitution rate will be zero percent. When the engine load is between 25 and 50% of rated load, the gaseous fuel substitution rate will be 50%. When the engine load is 75 to 100% of rated load, the gaseous fuel substitution rate would be 75%. The system would use three discrete output switches to control the three valves. The gaseous fuel flow rate of each being adjusted to provide 25% replacement of liquid (diesel) fuel. No valve open would establish the zero percent substitution rate. One valve open would establish the 25% substitution rate and so on.

In another embodiment, the same three valves are set to supply gaseous fuel where the 75% substitution rate is mapped to the 50 to 75% of rated load range and where operation is limited by potential spontaneous detonation of the air fuel mixture to the 50% substitution rate.

In yet another embodiment, the full-open flow rate of each of the three valves can be adjusted to provide different flow rates in the proportions 1:2:4. With independent control of each valve, 8 different relative flow rates from 0 to 7 may be supplied.

In still yet another embodiment, a by-pass might be manually adjusted to provide a flow at the 40% substitution rate. (In such a system, a cut-off valve must be provided to stop all gaseous fuel in an emergency or when the engine is not running.) The three adjustable solenoid valves are adjusted to pass 6, 7, and 8% of the substitution rate. The substitution rate could then be controlled to 46% in one load range, 53% in another load range, and 61% in yet another range. The desired substitution rates are achieved by opening one, two, or all three of the adjustable solenoid valves. While other arrangements are possible, this approach is practical and economical in permitting the use of three relatively limited flow rate valves. Of course, more discrete outputs and discrete adjustable solenoid valves would provide a wide range of substitution rates.

Figure 3:
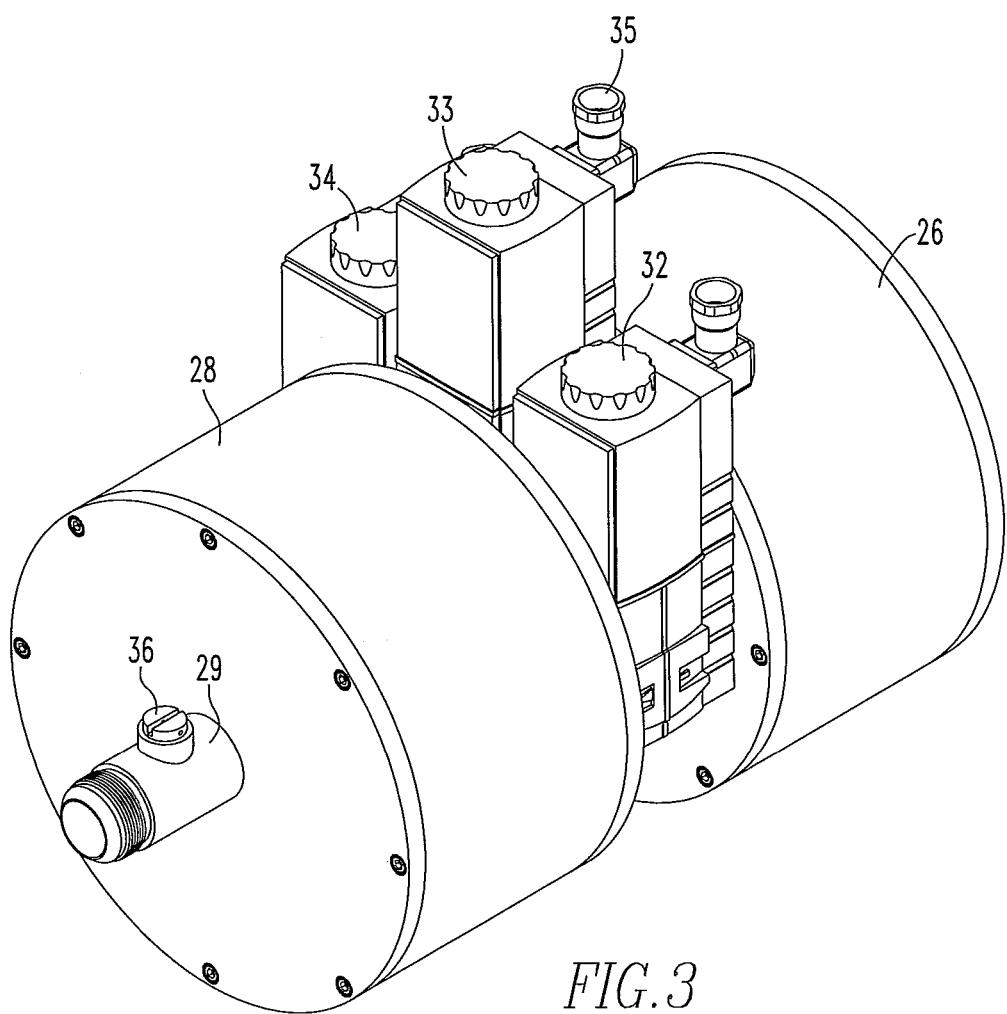
FIG. 3 is a perspective drawing of a valve assembly with associated inlet and outlet chambers for use with a gaseous fuel control system according to this invention.
Figure 4:
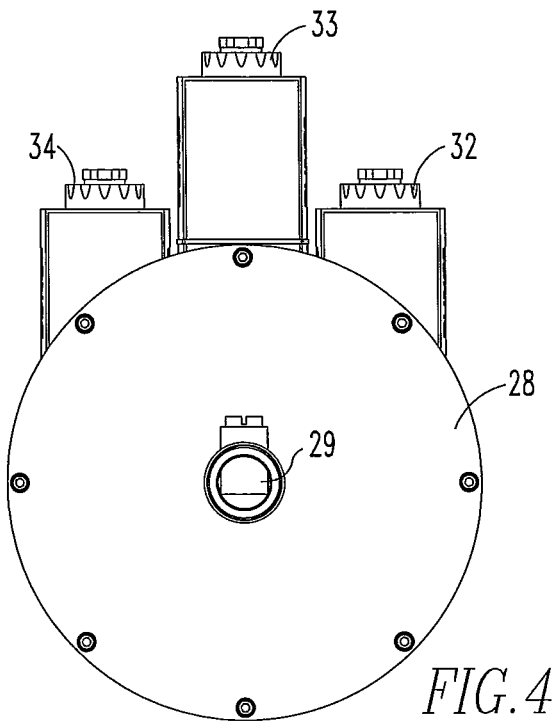
FIGS. 4, 5, 6, and 7 are inlet side, front, outlet side, and back side drawings respectively of the single channel valve assembly shown in FIG. 3.
Figure 5:
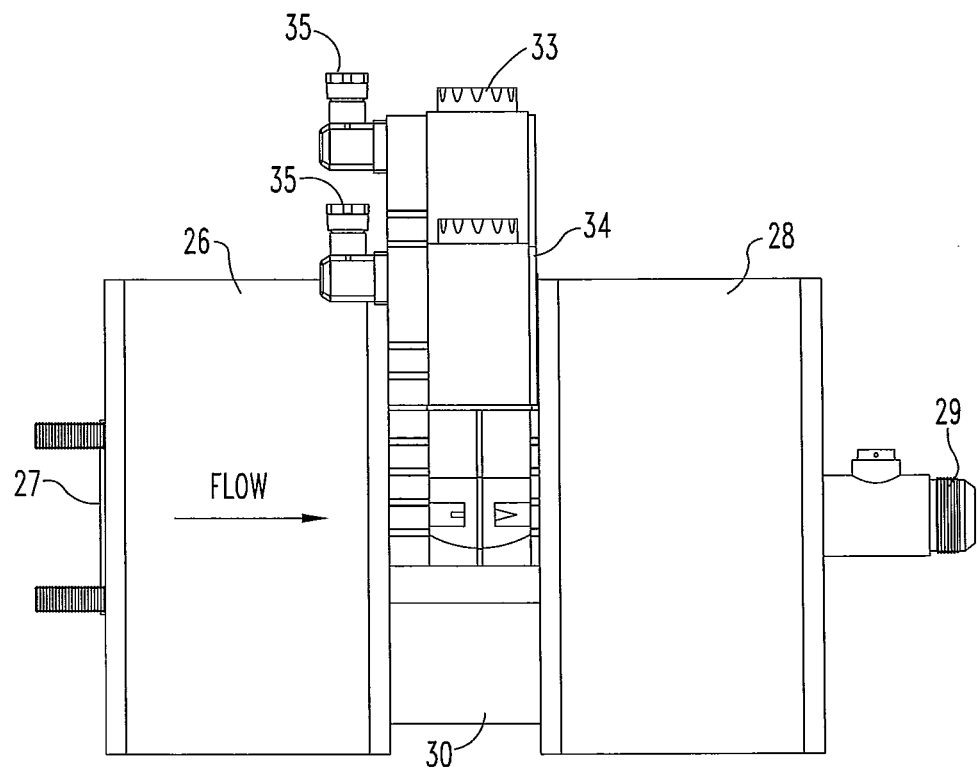
Figure 6:
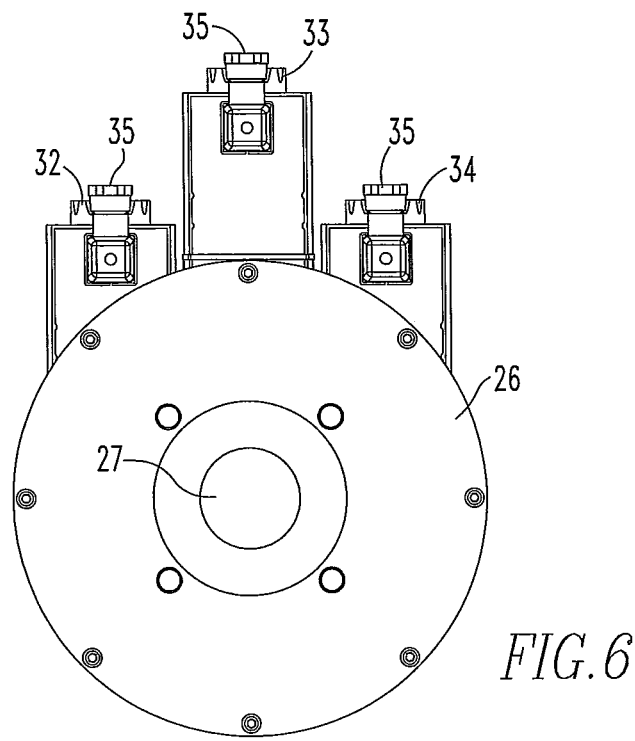
Figure 7:
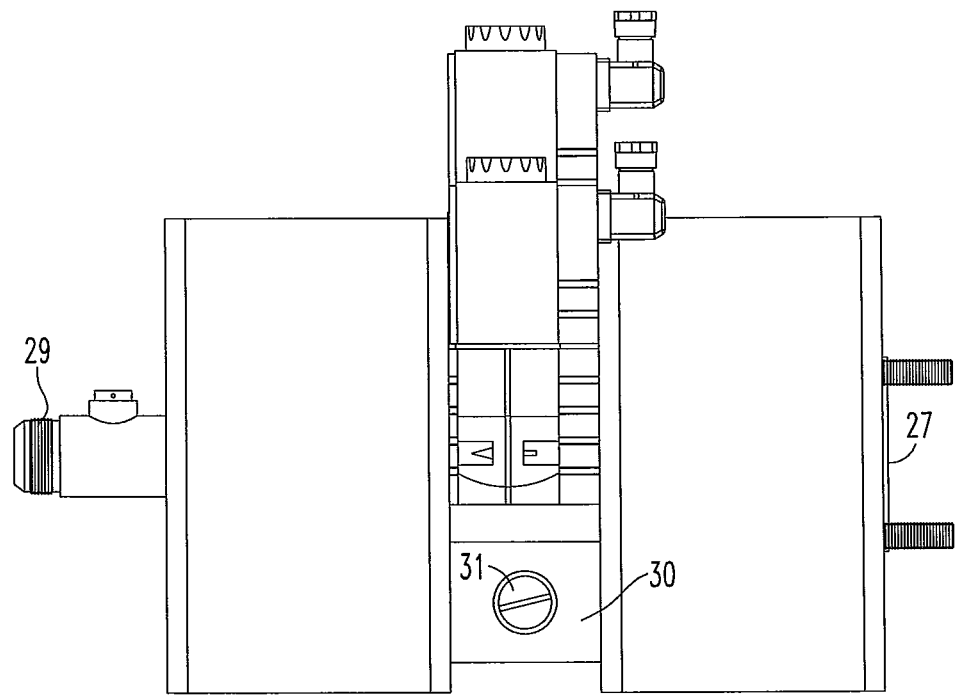

In typical dual-fuel systems, the gaseous fuel is introduced into the air stream of the diesel engine and gaseous fuel flow is directly proportional to the air flow determined by the gaseous fuel mixer being used. The flow restriction inherently provided by the gaseous fuel valve assemblies, as illustrated in FIGS. 3 and 8, reduces the gaseous fuel-to-air ratio.

Most preferably, the inlet and outlet chambers associated with the gaseous fuel supply valves are sufficiently large as to reduce an unexpected flow response.

In the most practical examples, the controlled gaseous fuel flow or substitution rate is based upon a load indicator such as sensed output power (KW) on a generator driven by a dual-fuel engine, air manifold pressure on a dual-fuel diesel engine, air manifold air flow on a dual-fuel diesel engine, or discharge flow of a liquid pump driven by a dual-fuel engine. However, other load indicators are possible. Any measure parameter which would give good correlation to the desired gaseous fuel substitution rate could be used.

Having thus defined my invention in the detail and particularity required by the patent laws, what is requested to be protected by Letters Patent is set forth in the following claims.

The invention claimed is:

1. A gaseous fuel control apparatus for use with a dual-fuel internal combustion engine that includes at least one combustion cylinder and an air intake manifold for delivering air to the at least one combustion chamber, and wherein gaseous fuel is fumigated to the air intake manifold and liquid fuel is injected into the at least one combustion chamber near an end of a compression stroke, the gaseous fuel control apparatus comprising:
- an input chamber having an inlet port,
- an outlet chamber having an outlet port for connection to the air intake manifold of the engine,
- a plurality of valves which can rapidly move between full-open and full-closed in response to digital control signals, said plurality of valves being positioned in parallel between the first inlet port and the outlet port and in parallel relative to gaseous fuel flow therethrough,
- a bypass line with a balancing valve connecting the inlet chamber with the outlet chamber, and
- said input chamber, said output chamber, said plurality of valves, and said bypass line being integrated in a single structural unit,
- an electronic system for monitoring an engine operating parameter, the electronic system including means for open-loop mapping of the engine parameter and sending digital control signals to said plurality of valves to establish a desired gaseous fuel flow rate to the engine air intake manifold based on the mapped engine operating parameter.

2. The gaseous fuel control apparatus according to claim 1, wherein the plurality of valves are solenoid valves with adjustable flow control orifices.

3. The gaseous fuel control apparatus according to claim 1, wherein the operating parameter is engine load.

4. The gaseous fuel control apparatus according to claim 1, in which full-open flow rates of a least two of said plurality of valves are different.

5. A genset consisting of a dual-fuel internal combustion engine driving a generator, said engine comprising one or more combustion cylinders and in which a gaseous fuel is fumigated to an air intake manifold and liquid fuel is injected into the cylinders near an end of a compression stroke, and a gaseous fuel control apparatus for controlling the amount of gaseous fuel supplied to the one or more cylinders of the engine comprising:
- an input chamber having an inlet port,
- an outlet chamber having an outlet port for connection to the air intake manifold of the engine
- a plurality of valves which can rapidly move between full-open and full-closed in response to digital control signals, said plurality of valves being positioned in parallel between the first inlet port and the outlet port and in parallel relative to gaseous fuel flow therethrough
- a bypass line with a balancing valve connecting the inlet chamber with the outlet chamber, and
- an electronic system for monitoring power output of the generator, the electronic system including means for open-loop mapping of the power output and sending digital control signals to said plurality of valves to establish a desired gaseous fuel flow rate to the engine air intake manifold based on the mapped power output.

6. The genset according to claim 5, wherein the plurality of valves are solenoid valves with adjustable flow control orifices.

7. A genset and fluid pump consisting of a dual-fuel internal combustion engine driving a generator for generating electricity for a pump on a fraking truck, said engine comprising one or more combustion cylinders and in which a gaseous fuel is fumigated to an air intake manifold and a liquid fuel is injected into the cylinders near the end of a compression stroke, and a gaseous fuel control apparatus for controlling the amount of gaseous fuel supplied to the one or more cylinders of the engine comprising:
- an input chamber having an inlet port,
- an outlet chamber having an outlet port for connection to the air intake manifold of the engine,
- a plurality of valves which can rapidly move between full-open and full-closed in response to digital control signals, said plurality of valves being positioned in parallel between the inlet port and the outlet port and in parallel relative to gaseous fuel flow therethrough,
- a bypass line with a balancing valve connecting the inlet chamber with the outlet chamber, and
- an electronic system for monitoring volume of fluid from the pump, the electronic system including means for open-loop mapping of the fluid flow volume and sending digital control signals to said plurality of valves to establish a desired gaseous fuel flow rate to the engine air intake manifold based on the mapped fluid flow volume.

8. The genset according to claim 7, wherein the plurality of valves are solenoid valves with adjustable flow control orifices.

9. An engine and fluid pump combination consisting of a dual-fuel internal combustion engine driving a pump on a hydrostatic fracturing truck, said engine comprising one or more combustion cylinders and in which a gaseous fuel is fumigated to an air intake manifold and the liquid fuel is injected into the cylinders near the end of the compression stroke, and a gaseous fuel control apparatus for controlling the amount of gaseous fuel supplied to the one or more cylinders of the engine comprising:
- an input chamber having an inlet port,
- an outlet chamber having an outlet port for connection to the air intake manifold of the engine,
- a plurality of valves which can rapidly move between full-open and full-closed in response to digital control signals, said plurality of valves being positioned in parallel between the first inlet port and the outlet port and in parallel relative to gaseous fuel flow therethrough,
- a bypass line with a balancing valve connecting the inlet chamber with the outlet chamber, and
- said input chamber, said output chamber, said plurality of valves, and said bypass line being integrated in a single structural unit,
- an electronic system for monitoring volume of fluid from the pump, the electronic system including means for open-loop mapping of the fluid flow volume and sending digital control signals to said plurality of valves to establish a desired gaseous fuel flow rate to the engine air intake manifold based on the mapped fluid flow volume.

* * * * *